United States Patent [19]

Filley

[11] Patent Number: 4,920,488

[45] Date of Patent: Apr. 24, 1990

[54] PHYSICAL INVENTORY SYSTEM

[76] Inventor: Oliver D. Filley, 440 Holland Rd., Far Hills, N.J. 07931

[21] Appl. No.: 372,188

[22] Filed: Jun. 26, 1989

Related U.S. Application Data

[63] Continuation of Ser. No. 132,960, Dec. 15, 1987, abandoned.

[51] Int. Cl.[5] .............................................. G06F 15/24
[52] U.S. Cl. ...................................... 364/403; 235/385
[58] Field of Search ........................ 364/403, 406, 428; 235/385

[56] References Cited

U.S. PATENT DOCUMENTS 3,637,989 1/1972 Howard et al. ...................... 235/385
4,514,815 4/1985 Anderson et al. ................... 235/385
4,621,325 11/1986 Najtzger et al. ..................... 235/385

Primary Examiner—Joseph Ruggiero
Assistant Examiner—Kimthanh Tbui
Attorney, Agent, or Firm—Eliot S. Gerber

[57] ABSTRACT

A system and method for the inventory of physical assets utilizes a digital computer based system including work station terminals each having an interactive graphics display screen in which the information displayed on the display screen may be graphically altered by the user. Inventory designation data may be obtained by a hand-held laser reader from a bar code label affixed to the item. Absolute geographic location data in terms of latitude, longitude and elevation, each within one foot of accuracy, is associated with each inventory item and with its designation data.

5 Claims, 2 Drawing Sheets

PHYSICAL INVENTORY SYSTEM

This application is a continuation of application Ser. No. 132,960, filed on 12-15-87, now abandoned

BACKGROUND OF THE INVENTION

The present invention relates to digital computer-based systems and more particularly to data base systems which account for a physical inventory.

At the present time it is known to account for a physical inventory of goods using hand entry into paper records. It is also presently known that a digital computer data system may be used to account for a physical inventory and that part of the information related to each piece of physical inventory may be at the location of each item. For example, a typical inventory system would record that a certain type of tool having an assigned number is located in a specified building. It is also known that each individual item may be named and designated by a label affixed to the item. One type of label which may be used in connection with a digital computer-based inventory system is a bar code label, which label is affixed to the item and having a bar code of black and white parallel stripes readable by a hand-held bar code reader. A person taking an inventory would move from place to place and direct the reading head of the bar code reader at the various bar code labels. A list is automatically prepared by accumulating the information from each bar code label on a portable recording device which is connected to the bar code reader. At a convenient time the recording device will unload the list, which may be compared against the master list or otherwise used as part of the physical inventory system.

A problem is presented when the inventory consists of land and fixtures, and items in or on the land, such as buildings, oil wells, pumps, and items within the building. There is a problem in relating the physical position of the land or the item to a known location. For example, certain tax authorities, such as state or local governments, may wish to levy a tax based on all the personal property owned by the taxpayer on a certain date. The inventory of a large corporation would include items that are within the taxing authority, subject to the personal property tax, and other items which may be outside the geographic area of the taxing authority, although still owned by the corporation. In that example, it is important to know not only the inventory of each item but also its physical location in respect to the geographic scope of the taxing authority.

OBJECTIVES AND FEATURES OF THE INVENTION

It is an objective of the present invention, called "The Benchmarc", to provide a digital computer data base system and method which will accurately store information regarding physical inventory, including information as to the location of each item in the inventory. related to its position in geographic space.

It is a further objective of the present invention that the information may be readily retrieved and may be readily changed as the items move from one location to another or as items are added or subtracted.

It is still a further objective of the present invention that the information may be available to the user at his premises in a simple, readily comprehended graphics format and further that a back-up copy of the information is held in security at a remote location, for example, in a different part of the country.

It is still a further objective of the present invention that the inventory information is displayed on computer work station terminals having interactive graphic screens, the terminals having interactive means by which the data may be altered by the operator directly on the screen and the changes on the screen will be immediately communicated to other work station terminal screens in the networks.

It is still a further objective of the present invention that the inventory system may be operated at relatively low cost so that the cost of maintaining each item currently in the inventory within the data base system may be only pennies per year.

It is a feature of the present invention to provide a system and method for the inventory of a large number of physical items, such as land, buildings, equipment, etc.

A label may be affixed to each item to uniquely identify that item by a bar code designation. A bar code reader, such as a hand-held bar code laser reader, is used to read the labels. The system further includes bar code data initial storage, for example, a portable teletransactional computer instrument, to store a collection of the bar code designation data.

Geographic locator means is used to associate data providing the absolute geographic location of each item in terms of latitude and longitude and elevation with the item designation data. Preferably the locator means utilizes a digitalized aerial photograph showing the location being located and a marker identified in a geographic map which is accurate to within one foot.

The system further includes a work station terminal used to display inventory data under user control. Each work station terminal includes an interactive graphics display screen and a stylus to alter or overlay the graphics displayed on the screen.

The work station terminals, at least one bar code initial storage means and a central digital computer unit form a local area network. A back-up storage means at a remote location, relative to the local area networks, is used to store duplicate inventory data as a back-up in case of loss or damage of the data held in the respective central digital computer units.

BRIEF DESCRIPTION OF THE DRAWINGS

Other objectives and features of the present invention will be apparent from the following detailed description setting forth the inventor's presently known best mode of practicing the invention. The detailed description should be taken in conjunction with the accompanying drawings.

In the drawings.

DETAILED DESCRIPTION OF THE INVENTION

Figure 1:
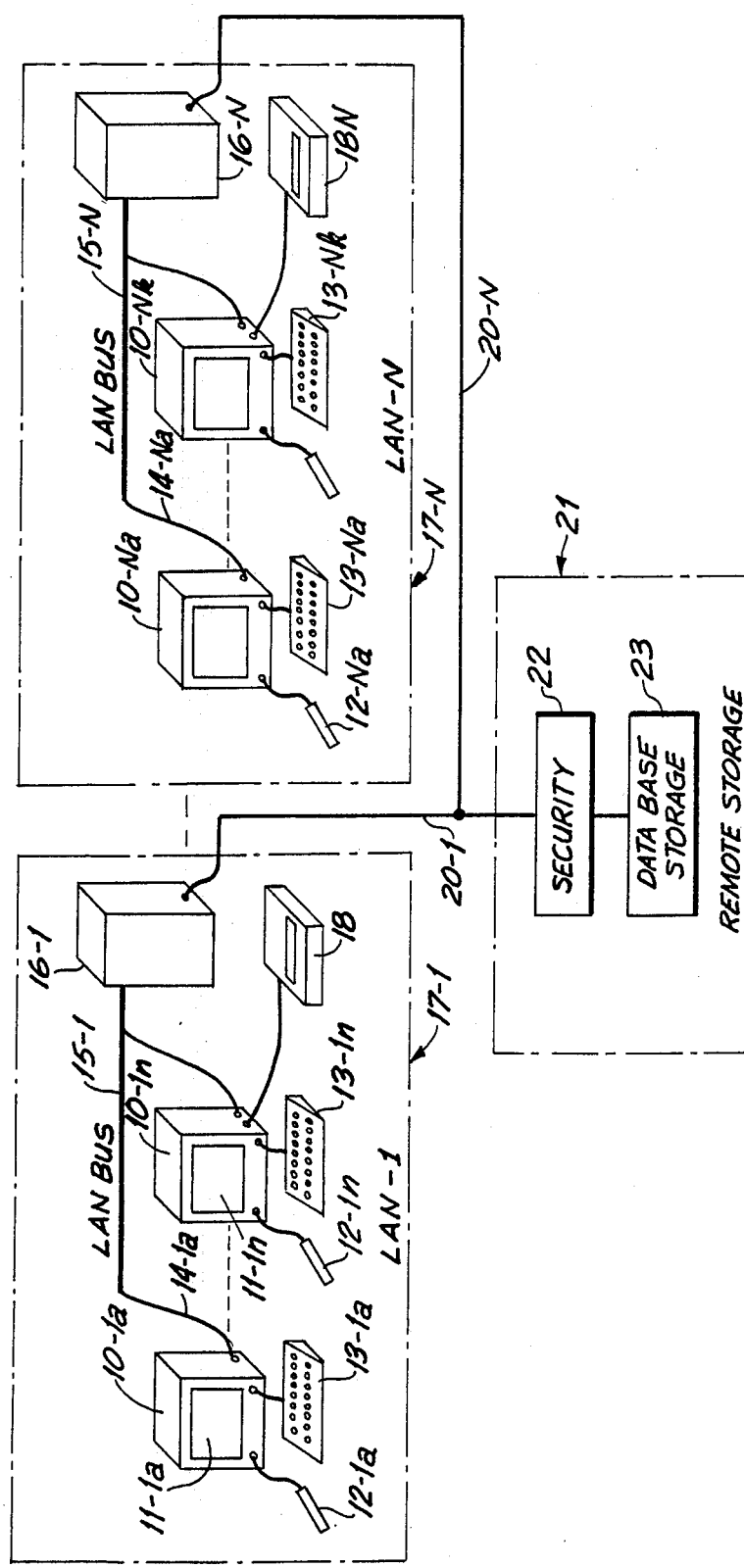
FIG. 1 is an overall block diagram of the system of the present invention.

As shown in FIG. 1, the system of the present invention comprises a number of groups of local area networks. This assumes that the user has a number of work station terminals. However, in the event the user has only one work station terminal, for example, if the user is a small business, the local area network would be replaced by a single terminal. The work station terminals are computer terminals 10, each of which has an interactive graphics display 11, the display being the screen of a cathode ray tube (CRT). Each of the terminals also has a means by which the user may alter the graphics directly on the display and simultaneously enter the information into the system, or alter such information, that means being preferably a stylus 12 or alternatively a "mouse", keyboard or scanner with vector capacity. A user may touch a stylus 12 to the interactive graphics display 11 to annotate an image. That annotation will be simultaneously displayed on the other work station terminals of the local area network. In addition, each of the terminals has a keyboard 13. Each terminal is connected by a communication line 14 to a bus 15. The bus, in turn, is connected to the central processing computer unit 16, which is a digital computer within the local area network.

Preferably, the system uses "split screen technology", which is explained below. There are two means of identifying an inventory item in the system. The first method is the "scientific locator" in which items are stored scientifically according to their physical location using latitude, longitude and elevation. The second identifying means is for the user to provide the inventory item with a generic or colloquial or familiar grid location name. This generic, colloquial or familiar grid location may be changed from time to time even though the item stays put. However, if the item is physically moved, the scientific locator must be changed to the address of the new position of the item. The work station screen preferably is a split screen which displays the scientific locator on one side and the generic, colloquial or familiar grid location simultaneously on the other side of the screen (graphics display 11).

Suitable work station terminals are manufactured by interand Corporation, Chicago, Illinois, whose DISCON 1000 is an integrated videographic teleconferencing system which may communicate over telephone lines. The DISCON 1000 uses a 19-inch display face having full color and seven color graphic annotations. It has a 19-inch RGB high resolution shadow mask CRT with a resolution of 1024 pixels horizontal, 480 vertical. An alternative is DISCON 725, which is a compact integrated teleconferencing system having a stylus so that the user may draw directly onto the videoe image and instantly transmit graphics over ordinary telephone lines.

In FIG. 1, within the local area network 1 there is shown, for purposes of clarity of illustration, only the first terminal, labeled 10-A, and the last terminal, labeled 10-1N. It will be understood, however, that there are a plurality of terminals indicated by the dash lines between them which constitute the local area network.

The computer unit is connected to the remote storage location 21 by means of communication line 20-1, which, for example, may be a telephone line or a satellite communication line. The function of the remote storage location 21 is a back-up system in case the information held within the local central computer 16-1 is destroyed or damaged.

As shown in FIG. 1, the remote storage location 21 has a security provision 22 and a data base storage 23, which is the back-up storage. The security is preferably a code word which is known only to the authorized person at the individual location. The code word must be keyed into the system before the back-up data base storage 23 may be accessed.

For simplicity of illustration, there is shown in FIG. 1 only two local area networks, labeled LAN-1 and LAN-N. It will be understood, however, that a large number of local area networks may have access to the remote storage location 21.

Figure 2A:
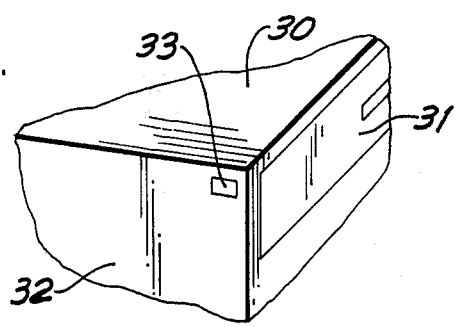
FIGS. 2 A & B are drawing in perspective of a computer terminal used as the input and output means of the system of FIG. 1.
Figure 2B:
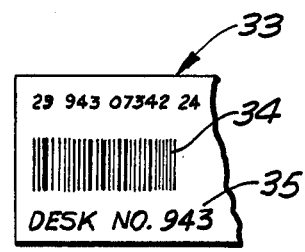

One method of labeling the individual items of an inventory is shown in FIGS. 2A and 2B. As shown in FIG. 2A, a disk 30 having a drawer 31 is labeled inconspicuously on its side 32 with a label 33. The label 33, enlarged, is shown in FIG. 2B. It is preferably a label having a bar code 34 consisting of a series of vertically aligned white and black lines. The label 33 may also have the same information in alphanumeric letters 35.

Figure 3:
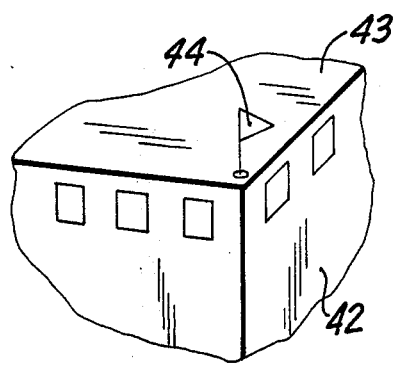
FIG. 3 illustrates the method and system of obtaining exact geographic information about an item of the physical inventory.
Figure 3:
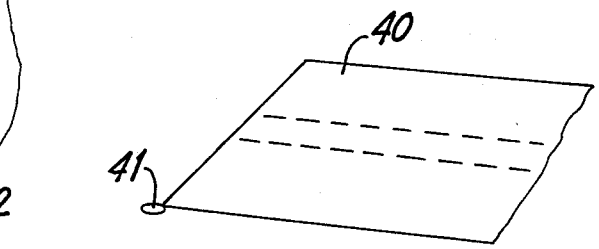

FIG. 3 illustrates one method of obtaining an exact and "absolute" geographic location. The absolute location is the position in terms of latitude and longitude and elevation, as distinct from a location by building, hut or street. As shown in FIG. 3, an airport runway 40 has its end marked by a marker 41. The exact geographic location of the end of the runway is known from maps of the United States Geographic Agency (NOAA). On those maps the position of the marker is exact within one foot or less. It is possible, by aerial photography, to utilize the airport marker as a position location and from that marker exactly locate every other object within the photograph.

As shown in FIG. 3, a building 42 having a roof 43 is located at its exact geographic position by placing a colored flag 44 on the corner of the roof. The flag 44 may be seen in an aerial photograph in relationship to the marker 41, which will be shown in the same photograph. Consequently, the exact location of the corner of the building 41 may be located in terms of longitude and latitude and elevation.

In one example, the geographic location is obtained from the generation of digital terrain elevation data (DTED). Precision computer-controlled electro-optical scanning of stereo pairs of high-resolution aerial photographs provides a digital record of the ground elevation at each latitude and longitude and elevation at the selected samples in the photographs. The precision instruments that generate DTED are available from Systems, Inc. Digital terrain elevation data (DETL) is a standard output of the Defense Mapping Agency. The algorithms and software exist to extract this data from stereo photography.

Preferably the location information, namely, exact longitude and latitude and elevation, is obtained from remote sensing, for example, from high resolution and photography, as mentioned above. The standard aerial photograph is a 9"×9" aerial photograph from the U.S.G.A. (United States Geographic Agency). Alternatively, the location may be obtained by a survey, using high precision surveying insturments.

A digitized image may be formed from the standard 9"×9" aerial photograph from the U.S.G.A.; for example, it may be digitized to 8,000×8,000 pixels by the digitizer 22. The area covered by the aerial photograph is about eight kilometers square, so the resolution of the pixels is about a meter on the ground. That data is then combined with elevation data on the computer.

The bar code label affixed on each item provides a "bar code designation" for that item. The bar code reader reads the labels and its output is "bar code inventory data" which is collected by the teletransactional computer instrument 19, which unloads the data to PC (computer terminal) 20, see FIG. 1. The "absolute geographic data" refers to the latitude and longitude, and in most cases the elevation, of each inventory item. It is distinct from data giving location by street address or building address. The absolute geogrpahic data and the item designation code are combined, for each item, to produce "inventory data" as to each item. A hand-held camera 21, for example, a 35-mm camera, produces images which are digitized by digitizer 22 and entered into the system.

Preferably the back-up storage (data base storage 23) is in another part of the country from the local area networks. For example, a mid-west back-up storage location would service a large number of local area networks located in the eastern United States. The back-up storage preferably utilizes, for its mass storage, non-erasable optical disks which are written and read by laser beams.

The system and method of the present invention may be viewed as analogous, in general concept, to "vector space" process in which "vector space" is a set representing a generalization of a system of vectors. The vectors here are the identification of items and their absolute geographic location which is in three-dimensional space and information is placed on images by the user. In contrast, a system with such absolute geographic location may be considered diametric or complementary, in general concept, to a "raster" system in which the scan pattern for items is from side to side in lines from top to bottom.

The "inventory data" preferably includes information, as to each item, telling "what", for example, a desk, "where" its absolute geographic location and its location within a building at an address, and "when", for example, the data it was purchased or the data it was refinished. Each item has a "three dimensional inventory standard", which is its latitude, longitude and elevation. Also each item has a laser bar code inventory which is the bar code label on the item. A "quality and quantity analysis standard" is provided as part of the inventory data and may be the item's replacement cost or fair market value. Further, each inventory data preferably employs the user's own numbering system for each item which provides a "filing, storage and retrieval standard".

The inventory data may be printed-out on "hard copy", preferably in color, at 300–400 pixels per square inch by a suitable printer such as a multi-color high-density dot matrix printer or a laser printer 18.

What is claimed is:

1. A method for the inventory of a large number of items comprising buildings, real estates and their fixtures, including the steps of:

affixing a bar code label to each item to uniquely identify that item by a bar code designation data;

reading said labels using a portable hand-held bar code reader means to obtain designation data;

storing a collection of said code designation data in an initial bar code data storage means in said reader means and subsequently transferring said designation data to a digital computer system;

selecting a geographic marker at an airport runway as the basis for the geographic location of items;

obtaining geographic location data for each item providing the absolute geographic location comprising the latitude and longitude and elevation thereof within one foot of accuracy in relationship to the geographic marker, and associating said geographic location data with said code designation data to form inventory data in the computer system so that each item is identified by a code designation and a geographic location accurate within one foot;

displaying the said inventory data on the screen of computer work station terminal means under control of the computer system; said work station terminal means incuding a graphics display screen and using input means to alter the inventory data displayed on said screen.

2. An invenotory method as in claim 1 wherein said step of obtaining geographic data utilizes a digitalized aerial photograph showing the runway marker and the item.

3. An inventory method as in claim 1 and including the additional steps of forming a plurality of local area networks, each local area network comprising a plurality of work station terminals and at least one bar code initial storage means and one digital computer system; and providing a back-up data storage means at a remote location relative to said local area networks to store a duplicate of said inventory data.

4. An inventory method as in claim 1 wherein the hand-held code reader means is a portable teletransactional instrument having a laser beam bar code reader.

5. An inventory method as in claim 1 wherein the step of obtaining geographic location data includes a determination of location from a high-resolution stereo aerial photograph.

* * * * *